United States Patent
Jung (10) Patent No.: US 6,300,987 B1
(45) Date of Patent: Oct. 9, 2001

(54) THIN FILM TRANSISTOR ARRAY PANELS FOR LIQUID CRYSTAL DISPLAYS

(75) Inventor: Byung-Hoo Jung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/204,369

(22) Filed: Dec. 4, 1998

(51) Int. Cl.[7] .................................................. G02F 1/1343
(52) U.S. Cl. ............................................. 349/39; 349/126
(58) Field of Search ................................ 349/126, 38, 39, 349/111

(56) References Cited

U.S. PATENT DOCUMENTS

| | | | |
|---|---|---|---|
| 5,394,258 | * 2/1995 | Morin et al. | 359/59 |
| 5,459,596 | * 10/1995 | Ueda et al. | 359/59 |
| 5,822,027 | * 10/1998 | Shimada et al. | 349/39 |
| 5,877,830 | * 3/1999 | Shimada et al. | 349/113 |

* cited by examiner

Primary Examiner—James A. Dudek
Assistant Examiner—Andrew Schechter
(74) Attorney, Agent, or Firm—Howrey Simon Arnold & White, LLP (57) ABSTRACT

A plurality of gate lines transmits scanning signals are formed on a substrate and a plurality of storage electrode lines are formed in parallel to the gate lines. The storage electrode lines and the gate lines are alternately arranged. A plurality of data lines transmitting image signals intersect the gate lines and the storage electrode lines with being insulated therefrom and a plurality of pixel electrodes are formed. The pixel electrode, which is connected to the thin film transistor which is turned on or off by the nth gate line 110, overlaps the nth and the (n–1)th storage electrode lines 210 which are respectively placed between the nth and the (n–1)th gate lines and between the (n–1)th and the (n 2)th gate lines, and the (n–1)th gate line 110. Therefore, abnormal electric field near the edges of the pixel electrodes is covered by the storage electrode lines and the gate lines.

8 Claims, 7 Drawing Sheets

THIN FILM TRANSISTOR ARRAY PANELS FOR LIQUID CRYSTAL DISPLAYS

BACKGROUND OF THE INVENTION (a) Field of the Invention

The present invention relates to thin film transistor array panels for liquid crystal displays (referred as LCDs hereinafter).

(b) Description of the Related Art

One of outstanding displays is a thin film transistor liquid crystal display (referred as LCD hereinafter), and it is important to reduce a manufacturing cost and to improve a image quality.

To reduce the cost, the manufacturing process needs to be simple. One of the way is to reduce the number of masks which are used in the process.

Meanwhile, one of important factors which affect to the image quality of the TFT LCD is an aperture ratio. In other word, the more the aperture ratio is large, the more the image is bright and clear. The number of the pixels needs to be increased to realize high resolution image, but the aperture ratio is decreased when the display is fixed, since the widths of metal wires and the size of a thin film transistor are limited.

Generally, in a conventional liquid crystal display, the portion outside pixel electrodes is covered with a black matrix which is formed on one of two panels of the LCD.

However the step in which an additional mask is used to form the black matrix is required, and the consideration of the alignment margin causes to be decreased.

SUMMARY OF THE INVENTION

It is an object of the present invention to provide a TFT substrate for a liquid crystal display which can be manufactured in simple process, of which aperture does not become decreased, and in which light leakage effect is protected.

To achieve these objects of the present invention, instead of forming the black matrix, storage electrode lines cover the light leakage which occurs near a pixel electrode by forming the pixel electrode to overlap adjacent two storage electrode lines and a previous gate lines at the same time In a thin film transistor array panel for a liquid crystal display according to the embodiments of the present invention, a plurality of gate lines are formed on an insulating substrate, a plurality of storage electrode lines to form a storage capacitance are formed on the insulating substrate and respectively arranged after respective gate lines. A plurality of data lines cross the gate lines and the storage electrode lines and are insulated with the lines. Thin film transistors having three electrodes are formed. Two of the electrodes are respectively connected to the gate line and the data line, and the rest of the electrodes is connect to a pixel electrode which overlaps adjacent two of the storage electrode lines and a gate line which is located between the two storage electrode lines at the same time.

The pixel electrode may overlap the data lines at the both edges, and an organic film as an insulating film may be formed between the pixel electrodes and the data lines.

The storage electrode lines may be connected to adjacent gate line in a couple, or not.

In a thin film transistor array panel for a liquid crystal display according to another embodiment of the present invention, a pixel electrode overlaps adjacent two of a plurality of storage electrode lines, a gate lines located between the two storage electrode lines, and data lines at the both edges. In this embodiment, the overlapping width of the pixel electrode and the storage electrode line and the date line at the side that the rubbing is started is wider than the overlapping width of the pixel electrode and the storage electrode line and the data line at the side that the rubbing is finished.

Since the edges of the pixel electrode are located over the storage electrode lines of data lines, the light leakage near the edges of the pixel electrodes is covered by wires such as the storage electrode lines or data lines without an additional black matrix. In addition, the light leakage is effectively covered by forming the overlapping width of the pixel electrode and the storage at the side where the light leakage widely occurred wider than the overlapping width at the opposite side.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be constructed as limited to the embodiments set forth herein; rather, these inventions are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Now, embodiments of the present invention will be described in detail with reference to the accompanying drawings.

The first embodiment of the present invention illustrates a substrate for a liquid crystal display.

Figure 1:
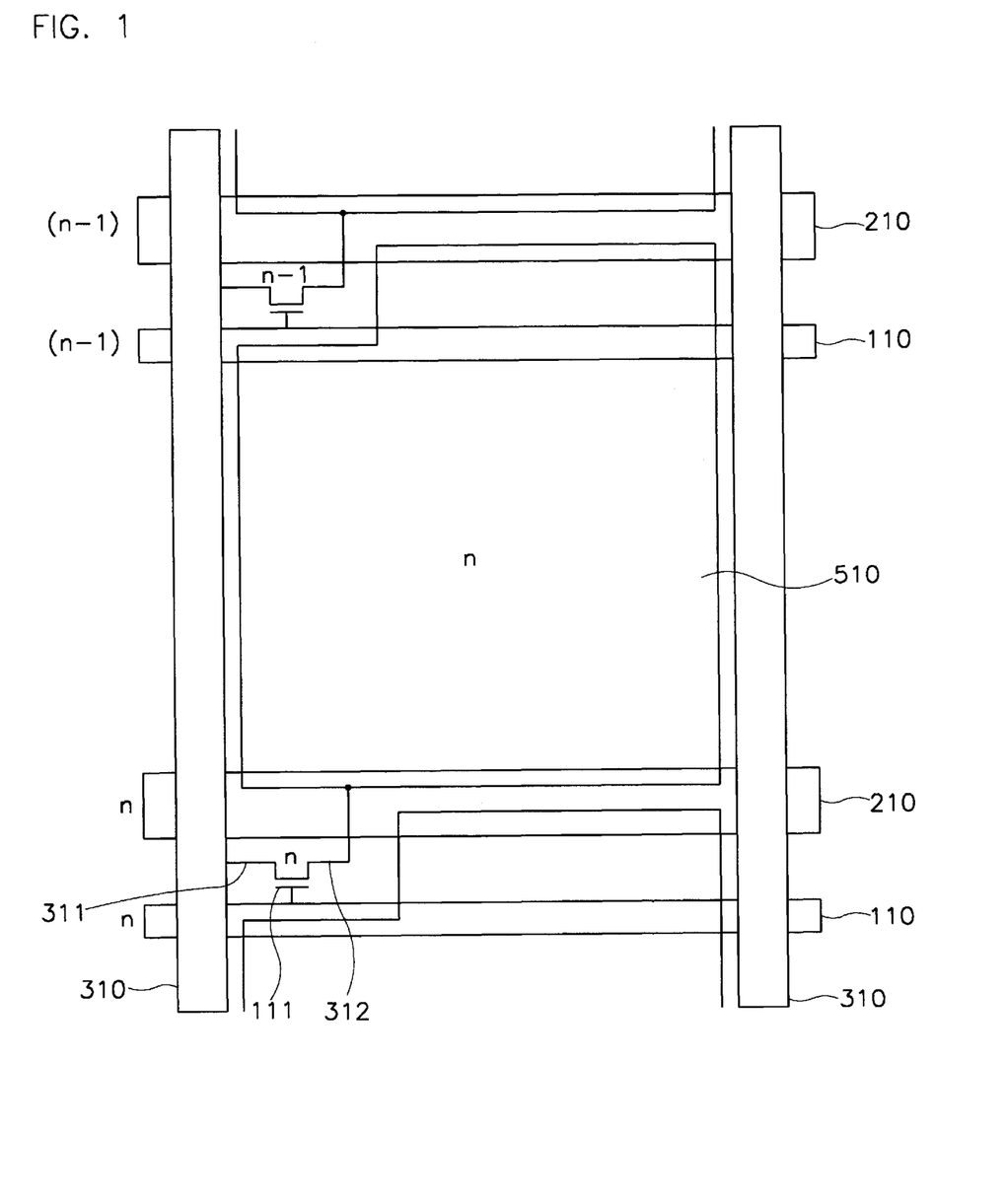
FIGS. 1 and 2 are a schematic diagram and a real layout view of a thin film transistor array panel according to the first embodiment of the present invention.

FIG. 1 is a schematic diagram of a thin film transistor array panel according to the first embodiment of the present invention, where arrangement of wires and a pixel electrode are shown briefly.

As shown in FIG. 1, a plurality of gate lines 110 transmitting scanning signals are formed in parallel to one another, and a plurality of storage electrode lines 210 are formed in parallel to the gate lines 110. Each storage electrode line 210 is arranged between two of the gate lines 110. A plurality of data lines 310 transmitting image signals intersect the gate lines 110 and the storage electrode lines 210 and are insulated therefrom. A plurality of pixel electrodes 510 are formed mostly in the areas which are surrounded by the gate lines 110 and the data lines 310. Thin film transistors having a gate electrode 111, a source electrode 311 and a drain electrode 312 respectively are connected to the gate line 110, the data line 310 and the pixel electrode 510 are formed.

As shown in FIG. 1, the pixel electrode 510, which is connected to the thin film transistor which is turned on or off by signals from the nth gate line 110, overlaps the nth storage electrode line 210 which lies between the nth and (n−1)th and the (n−1)th storage electrode line 210 between (n−1)th and (n−2)th gate lines, and the (n−1)th gate line 110. In detail, the pixel electrode 510 covers the space between the storage electrode line 210 and the gate line 110 at least in part and the transverse or horizontal edges of the pixel electrode 510 lies on the storage electrode lines 210 and the gate lines 110. Therefore, abnormal electric field near the transverse edges of the pixel electrodes is covered by the storage electrode lines 210 and the gate line 110.

This will be described in detail with reference to FIGS. 2 and 3.

Figure 2:
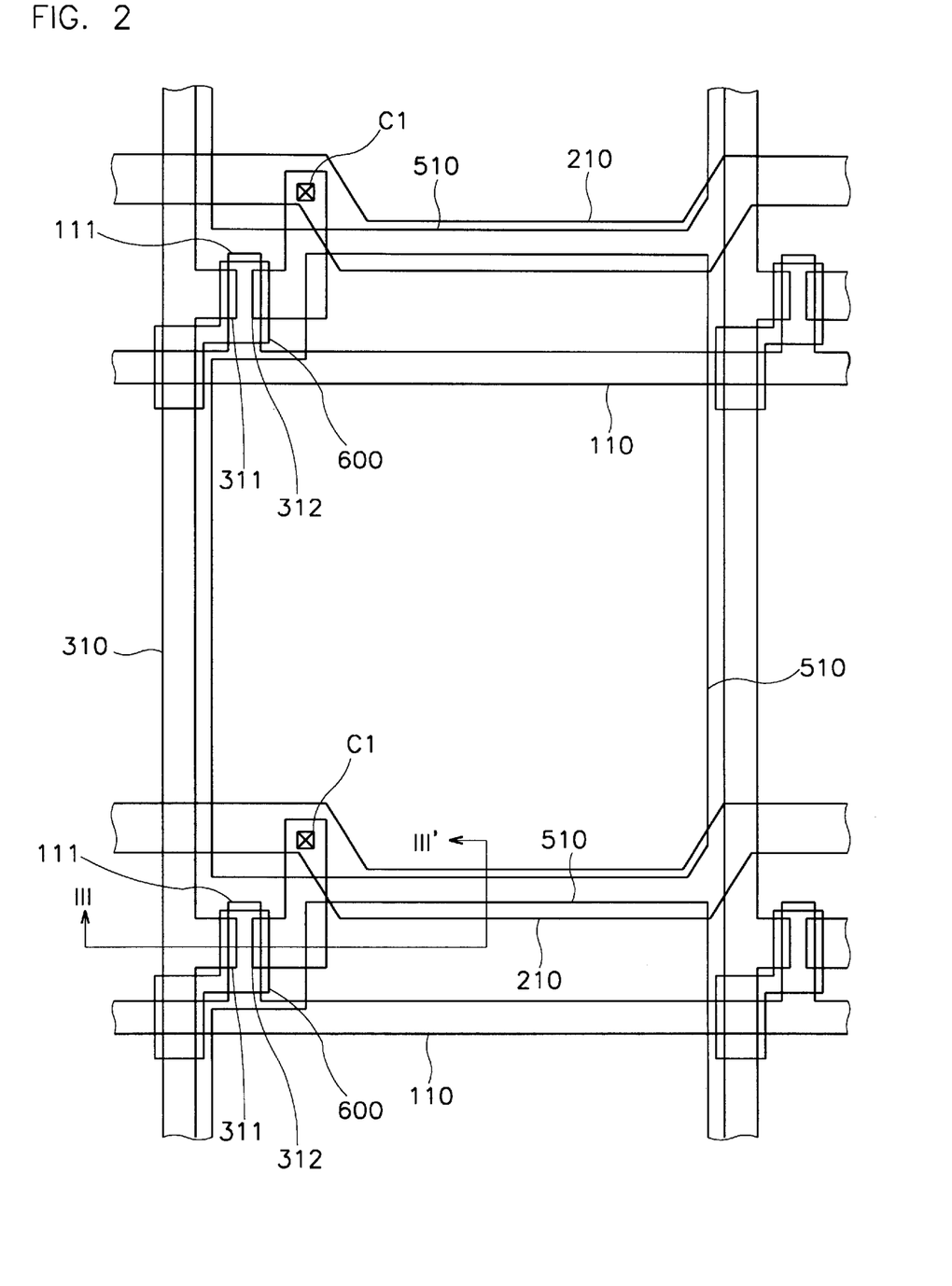
Figure 3:
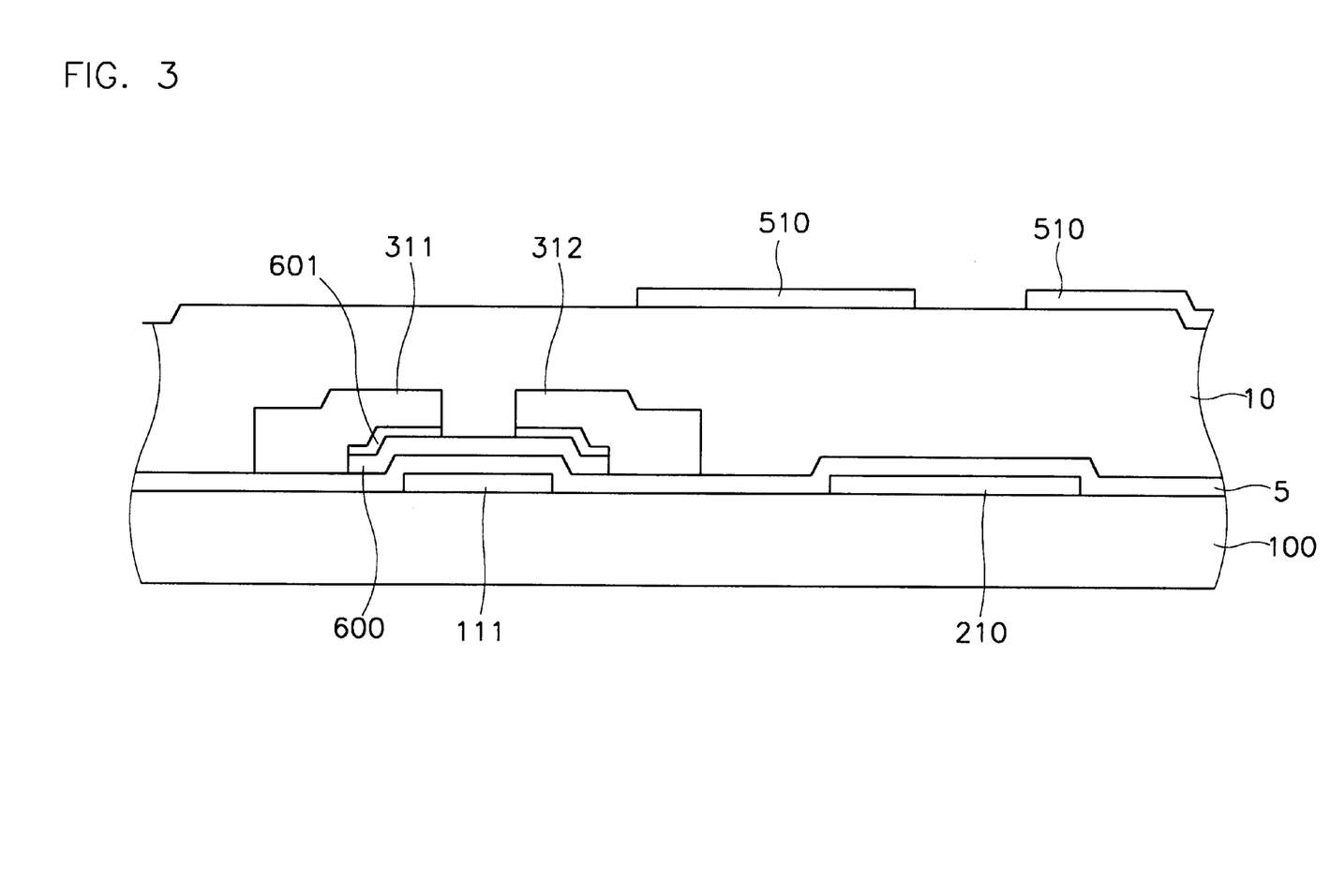
FIG. 3 is a cross sectional view taken along line III–III' in FIG. 2, FIGS. 4 and 5 are a schematic diagram and a real layout view of a thin film transistor array panel according to the second embodiment of the present invention.

FIG. 2 is a detailed layout view of a thin film transistor array panel according to the first embodiment of the present invention, and FIG. 3 is a cross sectional view taken along line III–III' in FIG. 2.

As shown in FIGS. 2 and 3, a gate wire such as a plurality of gate lines 110 and gate electrodes 111 which extend respectively from the gate line 110 is formed on an insulating substrate 100, and a plurality of storage electrode lines 210 on the substrate 100 are arranged in parallel to the gate lines 110. Each storage electrode line 210 is placed between two of the gate lines 110.

A gate insulating film 5 made of SiOx or SiNx covers the storage electrode lines 210 and the gate lines 110.

On the sate insulating film 5, semiconductor layers 600 made of amorphous silicon or poly-silicon are formed opposite the gate electrodes 111, and a plurality of data lines 310 are formed and intersect the gate lines 110 and the storage electrode lines 210. Source electrodes 311 extended from the data lines 310 are formed on the semiconductor layers 600, and drain electrodes 312 are formed on the semiconductor layers 600 opposite the source electrodes 311. As shown in FIG. 3, doped semiconductor layers 601 for reducing the resistance between the semiconductor layers 600 and the source and drain electrodes 311 and 312 are interposed between the semiconductor layers 600 and the source and the drain electrodes 311 and 312.

An interlayer insulating film 10, which is made of SiO2 or SiNx or had a multi-layered structure including the layers made of the SiO2 and SiNx, covers the data lines 310 the source and the drain electrodes 311 and 312, and the semiconductor layers 600. Contact holes C1 exposing the drain electrodes 312 are provided an the interlayer insulating film 10. In this embodiment the interlayer insulating film 10 may be made of a thick organic insulating film.

Pixel electrodes 510 which respectively are connected to the drain electrodes 312 through the contact holes C1 are formed on the interlayer insulating film 10. Transverse edges of the pixel electrode 510 are placed on the two adjacent storage electrode lines 210. The pixel electrodes 510 overlaps the gate line 110 between the two adjacent storage electrode lines 210. In detail, nth pixel electrode connected to the nth gate line via nth TFT overlaps the (n−1)th gate line, and the two storage electrode lines adjacent to the (n−1)th gate line.

In case of the structure according to the first embodiment of the present invention, the storage capacitance may increase since the pixel electrode overlaps the previous gate line 110 and the previous storage electrode line 210 as well as the storage electrode line 210. In addition, since the edges of the pixel electrode 510 lies on the storage electrode line and the previous storage electrode line 210, the light leakage region by disclination of liquid crystals which occurs near the edges of the pixel electrode 510 is located over the storage electiode line and the previous electrode line 510. As a result, the light leakage region is covered with the storage electrode line and the previous storage electrode line 510 without an additional black matrix.

This embodiment has the storage electrode line 210 which is isolated from the gate line 110 so that separate voltages can be applied to the storage electrode lines 210 and to the gate lines 110. However, the storage electrode may be connected to the respective gate lines. For example, the nth storage electrode line is electrically connected to the (n−1)th gate line in FIG. 1.

Next, a panel for a liquid crystal display according to the second embodiment of the present invention will be described in detail.

Figure 4:
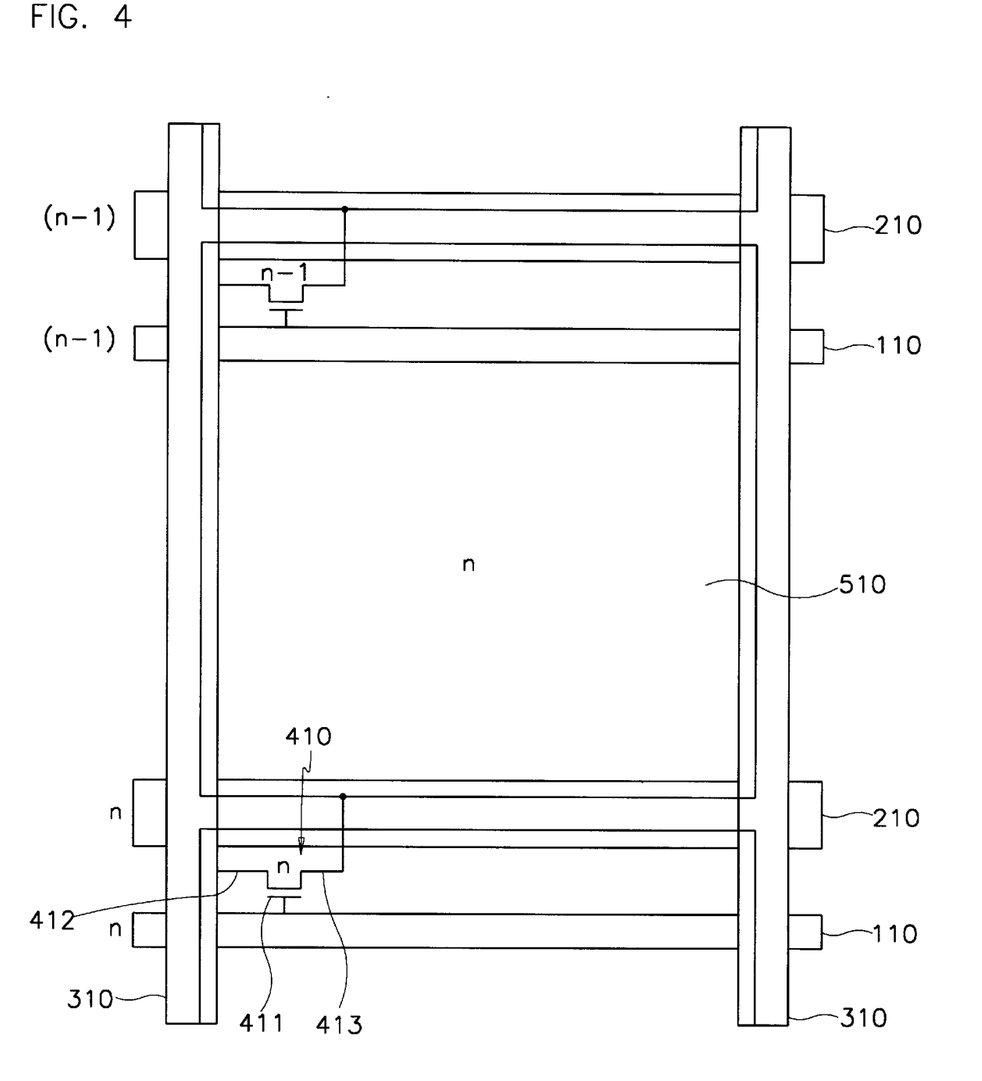
Figure 5:
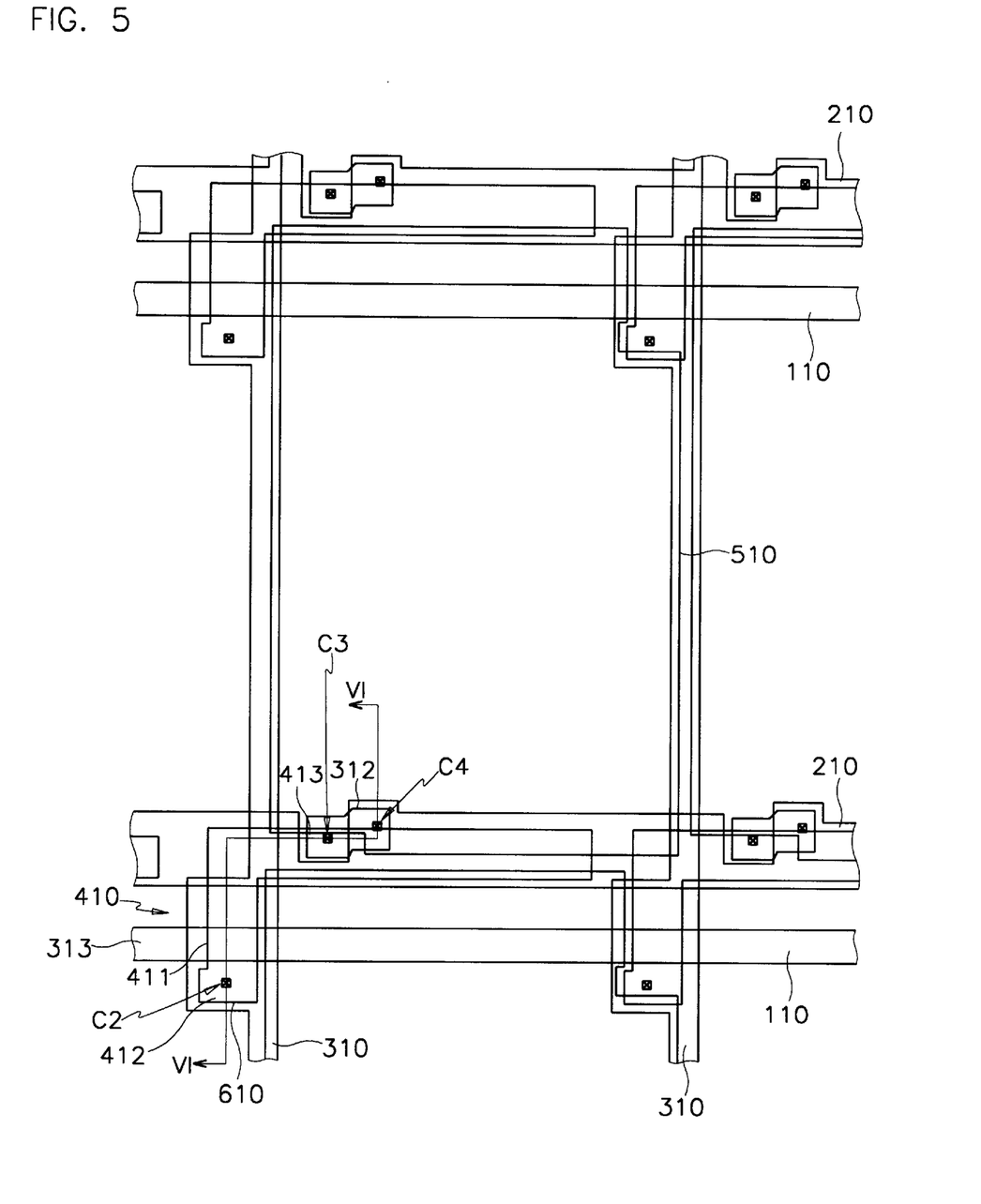
Figure 6:
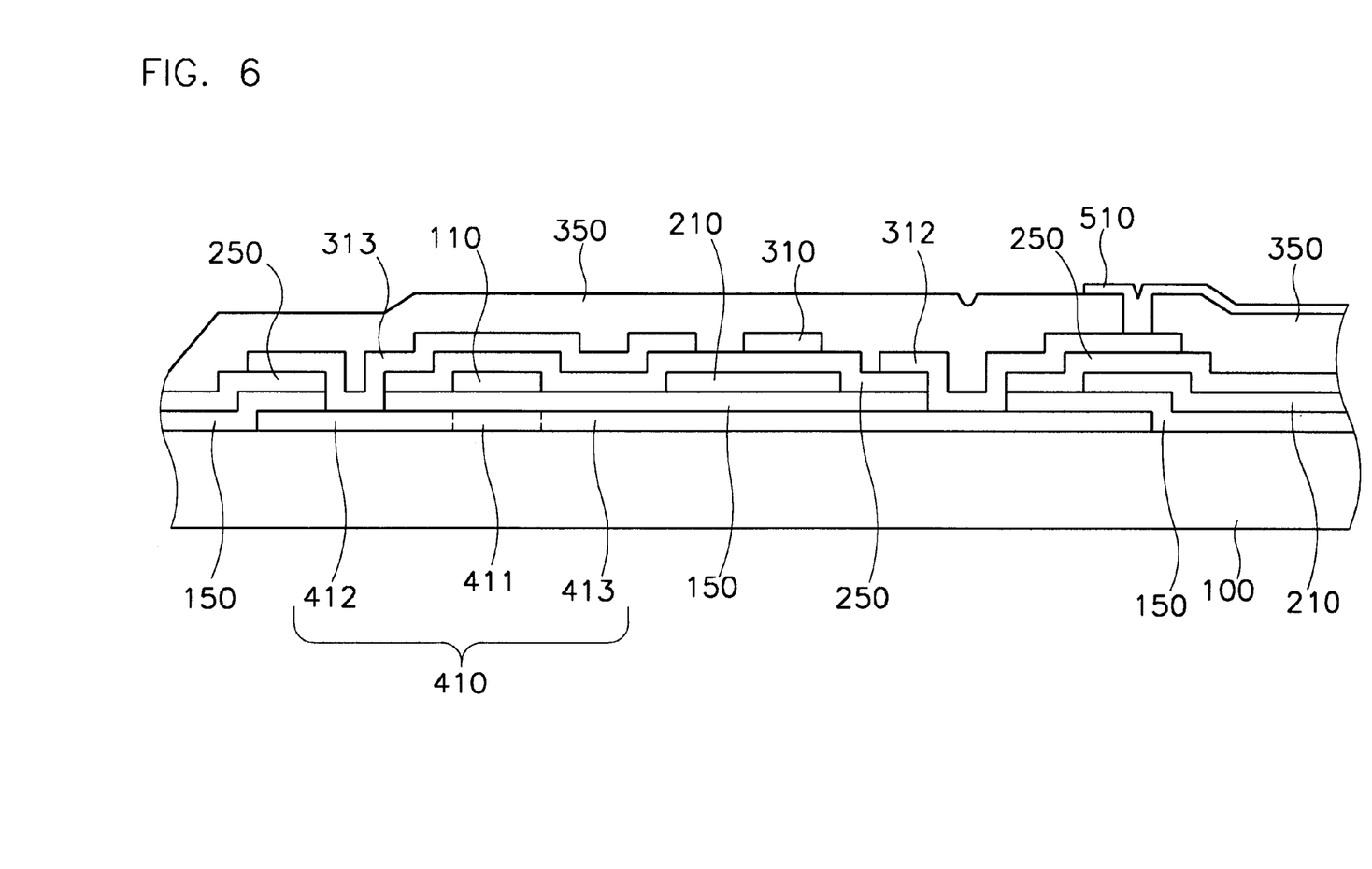
FIG. 6 is a cross sectional view taken along line VI–VI' in FIG. 5.

FIGS. 4 and 5 are a schematic diagram and a detailed layout view of a thin film transistor array panel according to the second embodiment of the present invention, and FIG. 6 is a cross sectional view taken along line VI–VI' in FIG. 5. The second embodiment relates to a polycrystalline silicon thin film transistor array panel.

As shown in FIGS. 4 to 6, semiconductor layers 410 which are made of a polycrystalline silicon are formed on a substrate 100, and a gate insulating film 150, which is made of SiO2 or SiNx is formed thereon. Gate lines 110 are transmitted are formed on the gate insulating film 150 in a horizontal direction. The semiconductor layer 410 includes several regions such as an undoped channel region 411 which is opposite the gate line 110, and a source and a drain regions 412 and 413 which are doped and located outside the channel region 411. Storage electrode lines 210 are formed on the gate insulating film 150 in parallel to the gate lines 110. The storage electrode lines 210 are placed between two of the gate line 110. At this structure, since the storage electrode lines 210 overlap a portion of the drain region 413 via the gate insulating 150, a storage capacitance is generated between the storage electrode line 210 and the drain region 413. An interlayer insulating film 250, which is made of SiO2 or SiNx, covers the gate line 110 and the storage electrode line 210, contact holes C2 and C3 respectively exposing the source and drain regions 412 and 413 are provided in the interlayer insulating film 250 and the gate insulating film 150. As in the first embodiment, the interlayer insulating film 250 may be made of the organic insulating material.

Data lines 310 transmitting image signals are formed on the interlayer insulating film 250 and intersect the gate lines 110 and the storage electrode lines 210. The data line 310 has a branch 313 which extends toward the source region 412 and the gate electrode 110. The branch 313 connected to the source region 412 through the contact hole C2 covers light leakage near the thin film transistor 410 as well as plays a role of a source electrode. Drain electrodes 312 respectively connected to the drain regions 413 through the contact holes C3 are made of the same material as the data line 310 and formed over the drain regions 413. A passivation film 350 made of $SiO_X$, $SiN_X$ or organic material covers the data lines 310 and the drain electrodes 312 and has via holes C4 which expose the drain electrodes 312.

Pixel electrodes 510 made of a transparent or opaque conductive material are formed on the passivation film 350 and respectively connected to the drain electrodes 312 through the via holes C4. The longitudinal edges of the pixel electrode 510 overlap the data lines 310, and the transverse or horizontal edges of the pixel electrode 510 overlap the storage electrode line 210.

Since the edges of the pixel electrode lies on the data line 310, the aperture ratio increases. Moreover, the branch 313 of the data line covers the thin film transistor 410.

Figure 7:
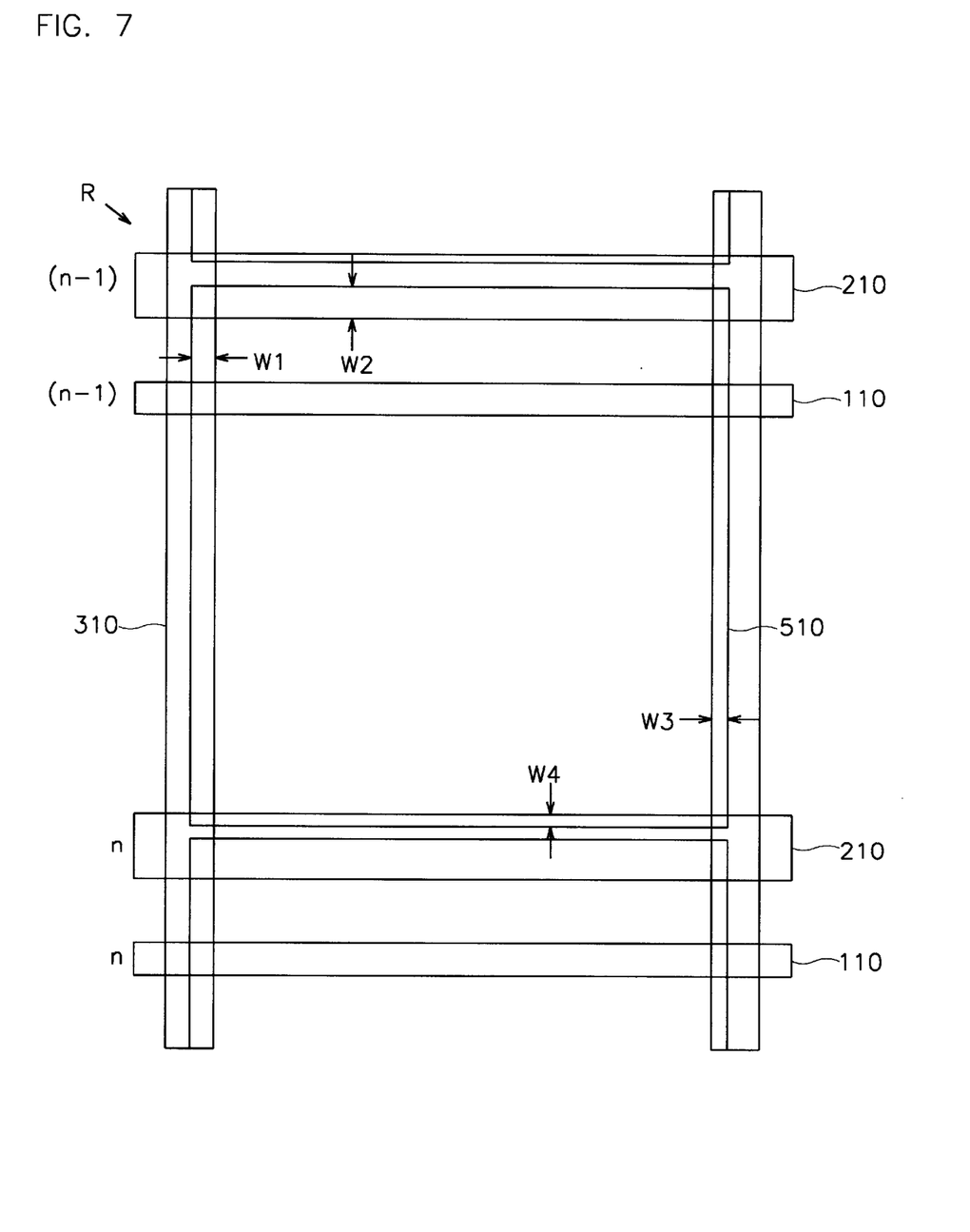
FIG. 7 is a schematic diagram of a thin film transistor array panel according to the third embodiment of the present invention.

FIG. 7 is a schematic diagram of a thin film transistor according to the third embodiment of the present invention, where gate lines, storage electrode lines, data lines and pixel electrode are shown only.

As shown in FIG. 7, gate lines 110 and storage electrode lines 210 are alternately arranged on a substrate. Data lines 310 intersect the gate lines 110 and the storage electrode lines 210 via an interlayer insulating film interposed therebetween. A passivation film which is made of acrylic material or organic material with 1.5 μm thickness covers the data lines 310, and pixel electrodes formed thereon. The longitudinal edges of the pixel electrode 510 overlap the data lines 310, and the transverse or the horizontal edges of the pixel electrode 510 overlap the storage electrode lines 210. However, the transverse or the horizontal edges may overlap the gate lines 110 when no storage electrode line is provided. The four edges of the pixel electrode 510 overlap the data lines 310 and the storage electrode lines 210 with different widths according to the rubbing direction. As shown in FIG. 7, in case that the rubbing direction is from the upper side of the left to the lower side of the right, an overlapping width (W1) of the left edge of the pixel electrode 510 and the data line 310 is wider than the overlapping width (W3) of the right edge of the pixel electrode 510 and the data line 310, and the overlapping width (W2) of the upper edge of the pixel electrode 510 and the previous storage electrode line 210 is wider than the overlapping width (W4) of the lower edge of the pixel electrode 510. The disclination regions of liquid crystals generated at the edges of the pixel electrode 510 is wider in the side that the rubbing is started than in the side that the rubbing is finished. Therefore, the light leakage is effectively covered in the third embodiment where the respective overlapping widths W1 and W2 of the pixel electrode 510 and the data line 310 and the storage electrode line 210 are wider than the respective overlapping widths W3 and W4 of the pixel electrode 510 and the data line 310 and the storage electrode line 210.

As described above, in the thin film transistor array panels for a liquid crystal display according to the embodiments of the present invention, the edges of two adjacent pixel electrodes are located over a wire such as the storage electrode line or data line at the same time to cover the light leakage region with the storage electrode line or the data lines. Therefore, any black matrix is not required. As the result, the manufacturing process become simple, decrease of an aperture ratio due to misalignment of any black matrix is prevented, and light leakage is effectively prevented.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A thin film transistor array panel for a liquid crystal display, comprising:
   an insulating substrate;
   a plurality of first wires that are formed on the insulating substrate and transmit scanning signals;
   a plurality of second wires on the insulating substrate, each second wire interposed between the first wires;
   a plurality of third wires that insulatedly intersect the first wires and the second wires, and transmit image signals;
   a plurality of thin film transistors, each thin film transistor having a first terminal a second terminal and a third terminal, wherein the first terminal and the second terminal are respectively connected to the first wire and the third wire;
   pixel electrodes respectively connected to the third terminals of the thin film transistors; and
   a first insulating layer interposed between the first pixel electrodes and the first wires and the second wires,
   wherein the pixel electrode overlaps adjacent two of the second wires, and one of the preceding first wires located between the adjacent two of second wires.

2. A thin film transistor array panel for a liquid crystal display of claim 1, further comprising a second insulating layer interposed between the pixel electrodes and the third wires, wherein the pixel electrodes overlap the third wires.

3. A thin film transistor array panel for a liquid crystal display of claim 2, wherein the second insulating layer comprises of an organic insulating film.

4. A thin film transistor array panel for a liquid crystal display of claim 1, wherein adjacent two of the plurality of the first and the second wires are electrically connected to each other.

5. A thin film transistor array panel for a liquid crystal display of claim 1, wherein the first and the second wires are separated from each other.

6. A thin film transistor array panel for a liquid crystal display, comprising:
   an insulating substrate;
   a plurality of first wires that are formed on the insulating substrate, extend in a first direction and transmit scanning signals;
   a plurality of second wires that extend in a second direction, are insulated from the first wires, and transmit image signals;
   a plurality of third wires that are formed on the insulating substrate and are substantially parallel to the first wires, wherein each third wire is placed between adjacent two of the first wires;
   pixel electrodes that respectively overlap adjacent two of the third wires and adjacent two of the second wires as well as one of the preceding first wires located between the adjacent two third wires;
   a first insulating layer interposed between the pixel electrodes and the first wire and the third wire; and
   a second insulating layer interposed between the pixel electrodes and the second wires,
   wherein the thin film transistor array panel is rubbed in a third direction which is oblique with respect to the first and the second directions, and overlapping widths of the pixel electrode and the second wire at first sides where the rubbing starts are wider than overlapping widths of the pixel electrode and the second wires at second sides where the rubbing ends.

7. A thin film transistor array panel for a liquid crystal display of claim 6, wherein overlapping widths of the pixel electrode and the third wires at the first sides are wider than overlapping widths of the pixel electrode and the third wires at the second sides.

8. A thin film transistor array panel for a liquid crystal display of claim 6, wherein the second insulating layer comprises an organic insulating film.

* * * * *